UNITED STATES PATENT OFFICE.

WILHELM HERZBERG AND OSWALD SCHARFENBERG, OF SCHÖNEBERG, NEAR BERLIN, GERMANY, ASSIGNORS TO ACTIEN GESELLSCHAFT FÜR ANILIN FABRIKATION, OF BERLIN, GERMANY.

AZO DYE.

1,038,884.  Specification of Letters Patent.  Patented Sept. 17, 1912.

No Drawing.  Application filed January 30, 1912. Serial No. 674,255.

*To all whom it may concern:*

Be it known that we, WILHELM HERZBERG and OSWALD SCHARFENBERG, citizens of the German Empire, residing at Schöneberg, near Berlin, Germany, our post-office addresses being, respectively, 24 Landshuterstrasse and 8 Wartburgstrasse, Schöneberg, near Berlin, Germany, have invented certain new and useful Improvements in Azo Dye, of which the following is a specification.

We have found that by combining the diazo compound of 2-methoxy-5-nitro-4-aminotoluene:

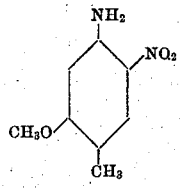

which may be obtained by acting with sodium methylate upon 2-chloro-5-nitro-4-aminotoluene and which forms long yellow prisms, melting at about 153° C., with 2-naphthol a new red monoazo coloring matter is produced. This new coloring matter, insoluble in water, is more especially adapted for the manufacture of pigments, which are distinguished by their bright red shade and their fastness to light. In manufacturing such pigments the coloring matter as to the purposes in the dry form or as a paste may be mixed with a usual addition, such as aluminium hydroxid, barium-sulfate and the like; but the coloring matter may be also produced in the presence of a suitable substratum. The pigments, thus obtained, on account of their clear shades, their insolubility in water, their great fastness to light, spirit and oil, are adapted just as well for printing wall-papers as for lithography and for oil-colors.

The following example serves to illustrate the invention: 18.5 parts, by weight, of 2-methoxy-5-nitro-4-aminotoluene are diazotized by means of 33 parts of hydrochloric acid 20° Bé. and 6.9 parts of sodium nitrite. The filtered solution of the diazo compound is combined with the solution of 14.4 parts of 2-naphthol, 8.5 parts of caustic soda-lye 40° Bé. and 30 parts of sodium acetate. The azo compound separates. It is drained, washed with water and if necessary dried and finely pulverized. The coloring-matter thus obtained forms a bright red powder, insoluble in water, insoluble in cold alcohol, but sparely soluble in hot alcohol with orange color. It dissolves in concentrated sulfuric acid to a violet solution, which by adding ice separates the coloring-matter in orange flakes. By strong reduction 4.5-diamino-2-methoxytoluene and 1-amino-2-naphthol are formed.

Having thus described our invention and in what manner it may be performed, what we claim is,—

The herein-described new red monoazo coloring-matter derived from 2-methoxy-5-nitro-4-aminotoluene and 2-naphthol and corresponding to the formula:

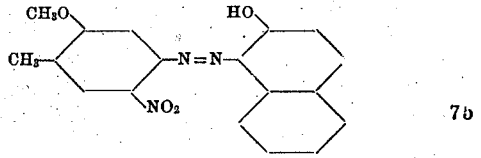

being more especially adapted for the manufacture of pigments and being insoluble in water, insoluble in cold alcohol, sparely soluble in hot alcohol, soluble in concentrated sulfuric acid to a violet solution, which separates the coloring-matter in orange flakes on addition of ice, and being split off by action of strong reducing agents to 4.5-diamino-2-methoxytoluene and 1-amino-2-naphthol.

In testimony whereof we have hereunto set our hands in presence of two subscribing witnesses.

WILHELM HERZBERG.
OSWALD SCHARFENBERG.

Witnesses:
 WOLDEMAR HAUPT,
 HENRY HASPER.